United States Patent [19]

Cole et al.

[11] 4,225,858

[45] Sep. 30, 1980

[54] DOPPLER INTRUSION DETECTOR WITH DUAL PHASE PROCESSING

[75] Inventors: Martin T. Cole, East Bentleigh; Graeme R. Strahan, Upwey, both of Australia

[73] Assignee: I.E.I. Proprietary Limited, Victoria, Australia

[21] Appl. No.: 850,270

[22] Filed: Nov. 10, 1977

[30] Foreign Application Priority Data

Nov. 10, 1976 [AU] Australia ............................ PC8074

[51] Int. Cl.² ............................................. G08B 13/18
[52] U.S. Cl. ................................. 340/554; 343/5 PD; 367/94
[58] Field of Search ............... 340/560, 554; 343/5 PD

[56] References Cited

U.S. PATENT DOCUMENTS

| | | | |
|---|---|---|---|
| 3,796,989 | 3/1974 | Ravas et al. ........................ | 340/560 |
| 3,838,408 | 9/1974 | McMaster ........................... | 340/560 |
| 3,845,461 | 10/1974 | Foreman ............................. | 340/560 |
| 3,846,778 | 11/1974 | Galvin et al. ...................... | 340/560 |
| 3,987,427 | 10/1976 | Clift .................................. | 343/5 PD |
| 4,012,730 | 3/1977 | Nicholls ............................. | 343/5 PD |

*Primary Examiner*—Glen R. Swann, III
*Attorney, Agent, or Firm*—Learman & McCulloch

[57] ABSTRACT

The reflected signal of a microwave or ultrasonic Doppler intrusion detector is split into two different channels, each containing a mixer for hetrodyning the received signal with a reference signal. The reference signal for one mixer is the transmitted signal, while the reference signal for the other mixer is the transmitted signal with a phase shift. Thus the outputs of the mixers are of the same frequency but different phase. A phase comparator produces two mutually exclusive pulse trains as a function of the outputs of the two mixers, one said output representing motion toward the detector and the other representing motion away from the detector. These pulse trains are applied through a bidirectional counter to upper and lower limit sensors. An alarm circuit is activated if either limit is exceeded, thus providing an alarm in response to sufficient motion in either direction.

8 Claims, 6 Drawing Figures

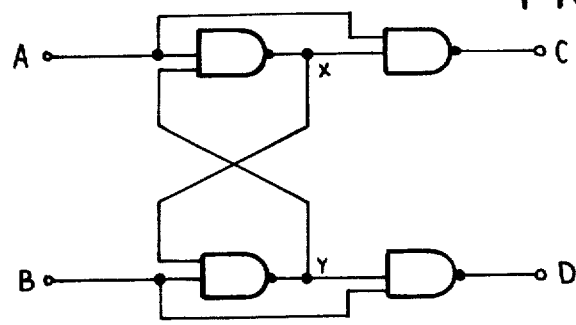
FIG. 3
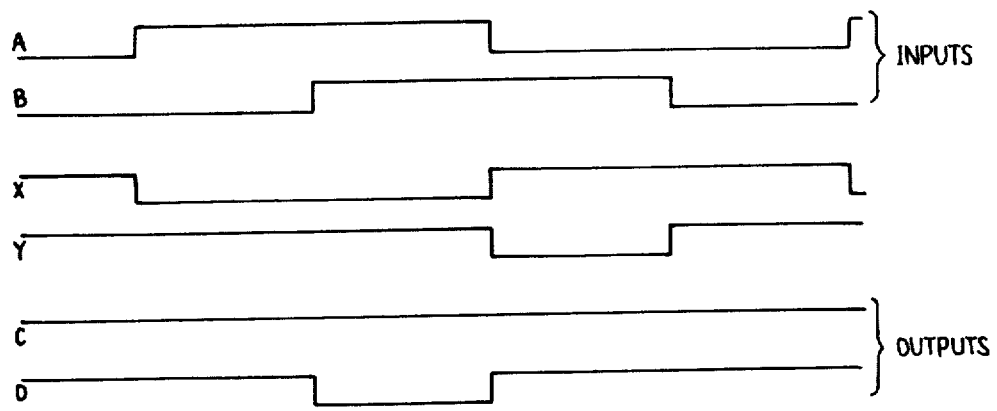
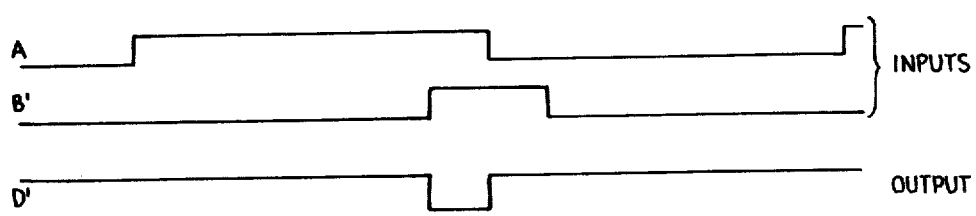
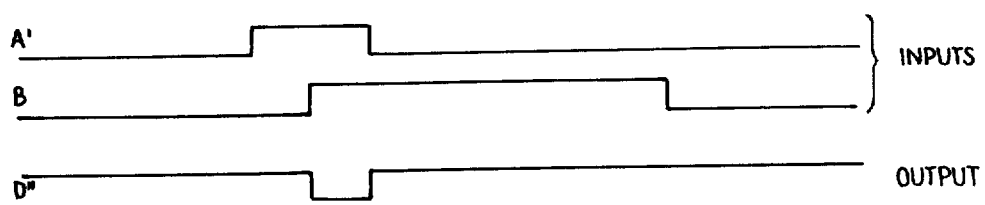
FIG. 5

DOPPLER INTRUSION DETECTOR WITH DUAL PHASE PROCESSING

BACKGROUND OF THE INVENTION

The invention relates to a movement detector utilizing the transmission and reception of signals for the purpose of detecting moving objects in a manner which effectively discrimates against unwanted interfering phenomena. These phenomena could otherwise cause false operation of the detector, or could prevent the operation of the detector. The signals may be produced from a micro wave or ultrasonic generator. A micro wave detector is described in our earlier application no. USSN 637,394 filed Dec. 3, 1975.

Movement detectors are known for detecting the movement of objects (preferably human) within an area of coverage. The detectors may operate with micro wave generators or with ultrasonic acoustic generators.

In general, an ultrasonic acoustic signal is transmitted into the area under surveillance and the signals reflected back from every object in the area, are returned to a receiver. Should one of the objects in that zone be moving then the signal received after reflection off that object will be of changing phase relative to the transmitted signal. The rate of change of phase is proportional to the velocity of movement of the object. By mixing this received signal with a portion of the transmitted signal, there is produced a resultant frequency equal to this rate of change of phase. This frequency is amplified and processed in order to activate an alarm when movement of objects within the area occurs.

Refinement of such designs in the form of controlled amplifier bandwith, threshold level and counting means reduces the possibility of false activation caused by objects moving in a manner not characteristic of human movement. These characteristics are speed, duration and frequency of occurrence.

The disadvantage of such design is that there is no ability to discriminate between linear and reciprocal motion. Thus, vibration could cause a false activation. A further improvement of such detectors has been the ability to determine the direction of motion taking place. By summing algebraeically the motion, then vibration shows zero net progression through the area, whilst motion of a human would show a nonzero net progression. Sufficient net progression would cause activation of the detector.

Of fundamental importance to the correct operation of such improved detectors is means to ensure perfect balance in detection of motion in one direction versus the other.

If the detector is more sensitive to motion in one direction than the other, then vibration would not appear as a perfectly zero net progression, such that false activation would result.

This invention achieves this balance by providing an improved method of obtaining and processing the information pertaining to the magnitude, velocity and direction of motion of the object in such a manner that errors are overcome and false activation prevented.

Existing designs utilize a mixer circuit to obtain two signals in phase quadrature. These two signals are of the same frequency and arise from the Doppler effect. The phase difference of the two frequencies will be such that if motion in the area occurs in one direction, then one signal will phase lead the other. If the direction of motion reverses, then that signal will phase lag the other. This relative phase lead or lag is used to determine the direction of motion.

These two Doppler signals are achieved by mixing the received ultrasonic signal with a portion of the transmitted signal. 90° phase quadrature is achieved by dividing the received signal into two paths (after amplification) and by inserting a 45° phase lead circuit into one path, and a 45° phase lag circuit into the other path. Upon mixing each of these signals with the same transmitter - derived signal, there results the said two Doppler signals in phase quadrature. A disadvantage of this system is that the phase lead and lag circuit cause attenuation and are frequency sensitive. Because of the Doppler shift the frequency of the received signal is effectively higher of lower than the transmitted frequency when movements exists. Because the phase lead or lag circuitry will only produce a 45° phase shift at one particular frequency, then errors in phase shift will occur at the Doppler shifted frequency. These errors could cause difficulties in the subsequent signal processing circuitry.

Therefore, embodied is this invention in the improvement whereby no phase change is introduced into either received signal path. Instead, a phase difference is introduced to the transmitter-derived signal, because this signal is always of constant frequency. Accordingly both the receiver signal and the transmitter signal are split into two paths. A phase delay is introduced into one of the transmitter signal paths. Two mixers are provided, resulting in two Doppler signals of equal frequency but differing phase as required.

These two Doppler signals are amplified within appropriate bandwidth and are presented to signal processing circuitry.

The signal processing circuitry can take many forms but all existing types known to the inventor are wired such that one signal is deemed a "reference", with which the other "variable" signal is compared. In such an arrangement, the reference signal is amplified, squared, clipped, differentiated or otherwise modified, whereas the variable signal is amplified linearly and not subject to such degree of modification. This unequal treatment of the two signals can give rise to problems of imbalance. The invention includes the improvement whereby the balance of the signals is perfectly maintained throughout. Differences in amplifier gain at different frequencies could cause false activation of the detector, particularly when movement occurs near the extremities of the area of coverage, where amplifier gain mismatch is most apparent. Accordingly the signal processing circuitry of the invention incorporates means to reject all imbalance caused by differences in signal amplitude.

There is provided, according to the invention a phase detecting means for use in an intrusion detector in which two Doppler signals of differing phase are produced by a signal generator, said phase detecting means including a set of logic gates for providing at least a twin channel output determined by the relative phase difference in said Doppler signals whereby if one signal leads another in phase then one output transmits the signal and vise versa.

The signal processing circuitry within the device of the invention provides a pulse train on one of two output channels. Only one such channel may produce an output pulse at the one instant. These channels are presented to a counter such that when an output pulse is received from one channel, the counter will count incrementally, whereas if an output pulse is received from the other channel, the counter will count decrementally. The two output channels represent motion in the forward direction and the reverse direction respectively, so that the counter will count either incrementally or decrementally in response to movement in the appropriate direction. Sufficient motion in one direction will result in the counter reaching a preset limit of counting, whereupon the detector output will be activated. Appropriately there are two such counting limits corresponding to a degree of movement in either one direction or the other direction. This degree of movement is adjustable by means of a "sensitivity" control.

An important result of the achievement of balance in the invention is the ability of the counter to effectively integrate the progression of an object through the area. Thus movement such as a combination of reciprocal and progressive motion will not confuse the detector. Motion such as an intruder walking one step backwards for each two steps forward would result in the counter registering a net change of one step forward. Some previous designs have attempted to overcome the confustion of the detector caused by a combination of reciprocal and progressive motion, by the incorporation of automatic gain control or feedback circuitry operating on the Doppler signals. However whilst this reduces the likelihood of false activation, it increases the chance of a person passing undetected by means of creating reciprocal interference.

A further important feature of the invention is that the degree of motion required before the detector output is activated (i.e. the sensitivity), is constant throughout the area and is independant of the direction of motion or the setting of the range control. Where this not the case, then the inclusion of a sensitivity control would be pointless, because its setting would have different effects at different points within the area. More importantly, currently available designs in which the sensitivity is dependant on the distance of the object are subject to false activations. With such designs, the sensitivity actually reduces while walking away yet increases while walking towards the detector. This imbalance can cause a false activation even although the movement is reciprocal about a static mean point.

Another feature of the counting system used within the invention is the fact that an alarm activation will result from movement of a set distance. Some other systems integrate the time for which the movement takes place. Of greater importance is the actual degree of movement taking place rather than the time taken to travel that distance. Because the counter is responsive to individual pulses which result from movement of an object through distance increments of one half-wavelength of the ultrasonic transmission, then by counting these pulses the counter is actually measuring the distance travelled, in units of half a wavelength. Thus, should an object move back at a different speed from that when moving forward, the counter will not be confused as to the actual distance travelled. Indeed, it would be possible to defeat a time integrating system by (for example) walking one step back at one speed, then two steps forward at double the speed, so that the time taken for either movement was the same; preventing recognition of the net progress through the area.

The counter used within the invention contains means for "decaying" the count value stored, over a long time period. This overcomes the possibility of false activation caused by long term building or environmental changes. If this decay is too rapid then it is possible for a person to pass undetected by means of walking one step, waiting and walking another step for example. Some designs incorporate a timer, to completely reset the counter every few seconds, reducing the chance of a false activation but increasing further the chance of a person passing undetected. These rapid decay designs make the detector prone to defeat. The balance within the invention permits decay over a longer period without prompting false activations, thereby providing an overall higher degree of immunity to both defeat and false activation.

The counter limit circuitry connects to the detector output circuitry which normally incorporates a relay to interface to an alarm system.

Incorporated within the invention is also an improved preamplifier which amplifies the received signal and presents it to the mixers. This preamplifier incorporates a gain adjustment configured as a "range" control to permit adjustment of the detector to suit areas of differing size. It has been discovered that if the preamplifier is permitted to saturate as a result of strong reflected signals, then essential information on the received signal is lost. Such a situation can occur if a large object is placed close to the front of the detector, thereby blinding the detector to movement occurring beyond the large object. Indeed it may be possible to confuse the direction of motion occurring beyond the large object, resulting in false activation. Accordingly there is included in the invention an automatic gain control circuit operating on the ultrasonic signal (not the Doppler signals). This simply prevents the amplitude of the signals reaching saturation, without introducing distortion and thereby losing information. This improvement does not permit a person to pass undetected by means of creating reciprocal interference, yet it reduces the possibility of false activations.

Apart from the benefits of improved detection plus rejection of false activation, the circuitry of the invention is simplified over previous designs and permits savings in cost and assembly. Particularly the need for special set-up of balancing controls is not required because the circuitry is immune to production tolerance variations. The only adjustments are those of "range" and "sensitivity" which are provided only for customer convenience.

DESCRIPTION OF THE DRAWINGS

FIG. 3 is a schematic view of an electronic phase comparator.
FIG. 5 illustrates input and output waveforms for the phase comparator of FIG. 3.

DESCRIPTION OF THE CIRCUITRY

Figure 1:
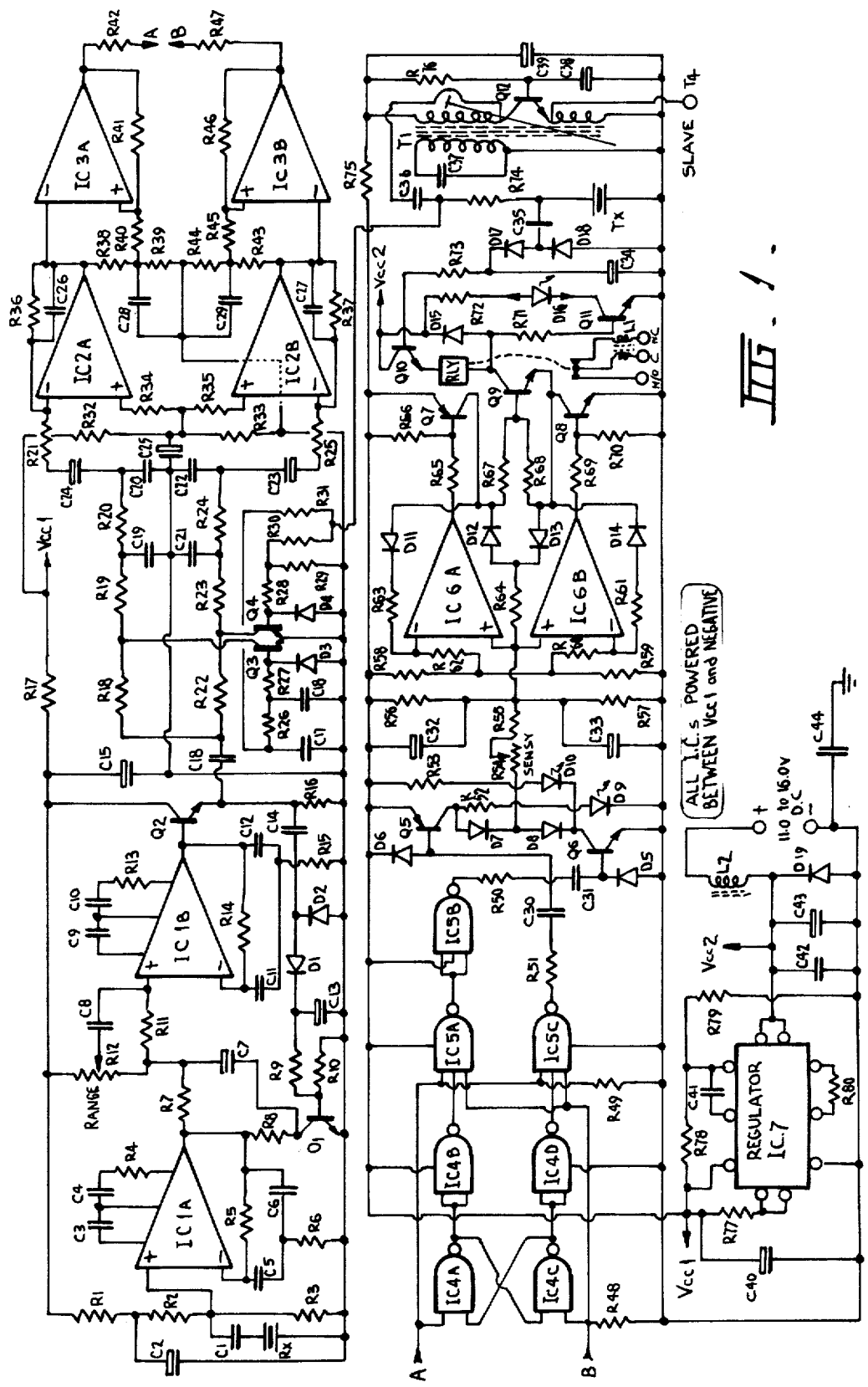
FIG. 1 is a circuit diagram of the detector apparatus.
Figure 2:
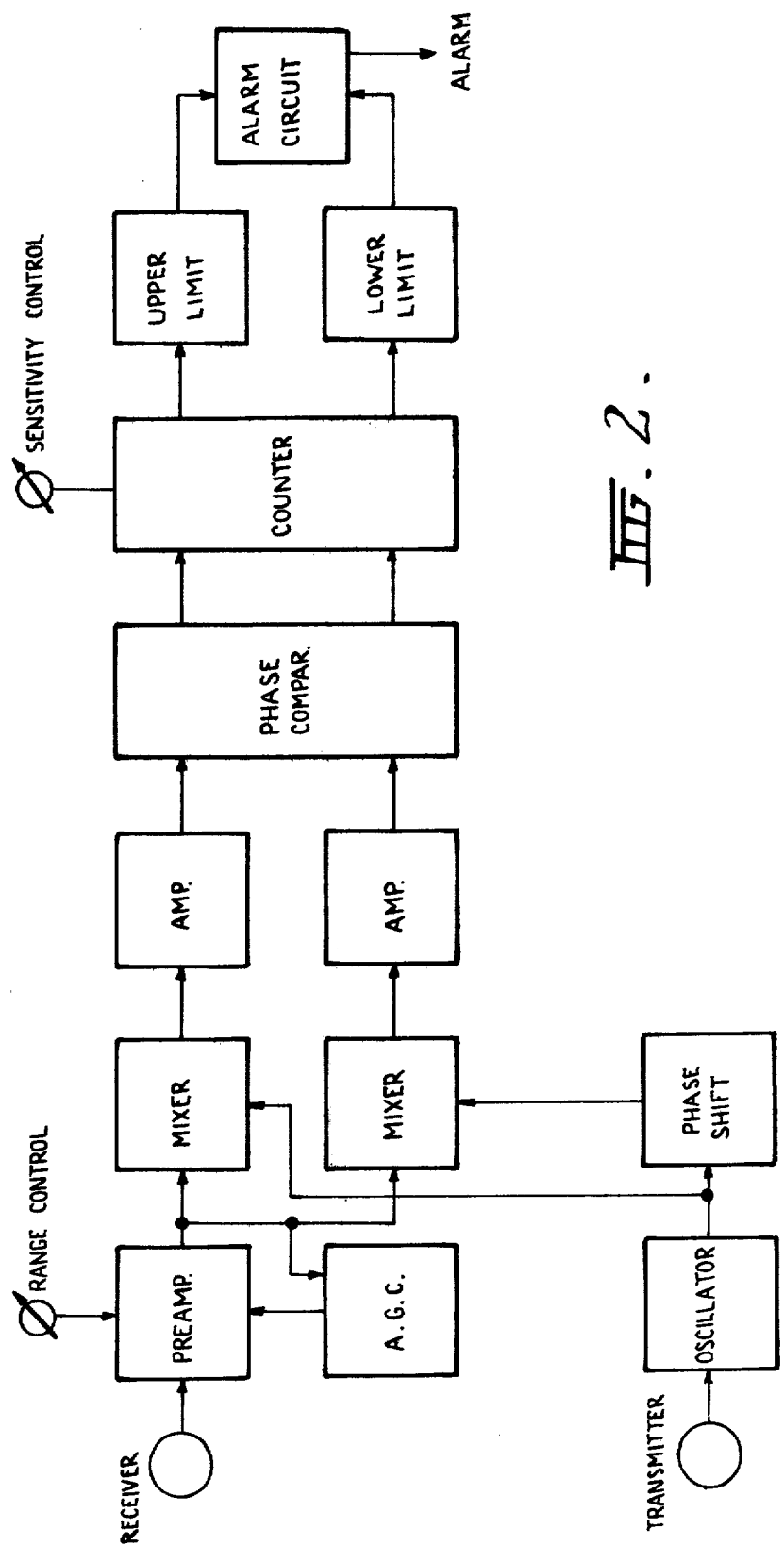
FIG. 2 is a complete block schematic of the detector.

Referring to FIGS. 1 and 2 ultrasonic sound waves are transmitted via the transducer "Tx" to flood the area under the surveillance with said sound. Ultrasonic sound waves reflected off every object in the area are received by a second transducer "Rx". The resultant signal is amplified by the preamplifier section (PREAMP) incorporating two integrated circuit amplifiers (IC1a, IC1b). Also incorporated in this section is a range control (R12), an impedance buffer (Q2) and an automatic gain control circuit (Q1) (A.G.C.). The next section is the mixer circuit whereby the ultrasonic signal is split into two paths (R18, R22) and each is chopped by a transistor (Q3, Q4). These transistors are driven from the oscillator circuit (Q12) but with differing phase. The output from this mixer section is two audio-frequency signals which differ only in phase. These signals are each amplified (IC2a, IC2b) (AMP) and presented to a phase comparator (IC3a, IC3b) which contains slight switching hysteresis.

The resultant digital signals, indentical in all aspects except phase, are presented to the digital phase comparator section (IC4, IC5). The output from this section is presented to the counter section (Q5, Q6) which incorporates a sensitivity control (R54).

The effective value of the counter output is sensed by a pair of threshold level switches (IC6a, IC6b). The output of these threshold devices is presented to a configuration of transistors (Q7, Q8, Q9) which can cause a relay (RLY) to de-energise in the event of an alarm.

Provision is also made (Q10) to de-energise the relay in the event that the oscillator signal disappears or the transmitting transducer (Tx) is shorted. In addition there is a solid-state lamp which will light during the alarm condition (Q11, D16). To further assist with installation adjustment, there is provided a pair of lamps, one of which will flash depending on the direction of motion of an intruder (D9, D10).

The whole system is powered from 12 volts D.C. and this voltage is regulated and filtered (IC7).

The transmit transducer Tx is driven by an oscillator. The receive transducer is connected to a narrow-band preamplifier incorporating a range control and has an automatic gain control (A.G.C.) to prevent amplitude saturation. The received and amplified ultrasonic signal is split into two paths and presented to two identical mixers. One mixer is driven by the transmitter oscillator direct whereas the other mixer is driven by the oscillator via a phase shifting network. The output of each mixer is presented to separate amplifiers of controlled bandwith and thence to a phase comparator. The phase comparator incorporates a voltage threshold comparator for each signal and a phase sensitive detector of a type depicted in FIG. 3. The outputs of the phase comparator connect to a counter which can count bidirectionally and is of a type depicted in FIG. 4. Upper limit and lower limit threshold voltage comparators are connected to the counter and in turn, these couple to an alarm output circuit which will cause an alarm should one of the counter limits be reached.

DESCRIPTION OF PHASE COMPARATOR

In the preferred embodiment of the phase comparator, there is included a set of NAND logic gates wired as shown in FIG. 3. The two input channels "A" and "B" are preceded by a voltage comparator to square the sinusoidal output signals of the amplifiers, to suit the logic switching operation of the gates. When movement exists in the area under surveillance, the resultant square wave signals presented to input A and B differ in phase by 90° for best results.

FIG. 5 also shows waveforms for input and output channels of the phase comparator. The operation is such that the first wave front to rise will determine which output channel ("C" or "D") will operate. Illustrated is the operation resulting from the A channel rising before the B channel. This inhibits the operation of the C output and permits an output pulse from the D channel. This output pulse is duly presented to the counter.

Should motion within the area change direction then the "B" channel wave front will precede the A channel. The symmetry of the phase detector circuit is such that the D channel would now be inhibited and the C channel would provide an output pulse. Thus there is provided means for providing pulses from one channel or another, dependant upon the phase relationship of the input channels.

An additional feature of the phase comparator is the immunity to problems caused by possible impalance in output from the amplifiers, caused by differing gain at various frequencies. At the furtherest extent of the range of area coverage, one channel may produce a waveform of narrower width than the other. This is illustrated in two situations. Where the A channel is normal and the B channel is reduced (B') then the output channel (D') pulse will reduce in width. Alternatively, if the B channel is normal and the A channel is reduced (A') then the output channel (D'') pulse is reduced to the same width. Thus, the difference in input pulse width does not reduce the ability of the phase detector to activate the correct output channel, but the output pulse width reduces. The symmetry of the phase detector is such that if one amplifier gain exceeds the other, then regardless of the direction of motion within the area, the correct output will be activated and the output pulse widths will be the same (although reduced) for either channel. Any subsequent counting system responsive to pulse width will not therefore give undue weight to the output of one channel over the other. This overcomes false activations which would otherwise be caused by an object moving equally forward and back, near the extremity of the range.

In the extreme, where no output exists from one of the amplifiers, then no output will result from either channel of the phase detector.

The above advantages are achieved without the necessity for any form of balancing adjustment within the amplifiers, the phase detector or the counter. This fact not only provides for simplicity in manufacture and set-up, but overcomes the problem of drift in component parameters over a period of time in service.

The overall performance of the phase comparator is improved further by the provision of slight hysteresis in the switching of the voltage comparators.

DESCRIPTION OF THE COUNTER

Figure 4:
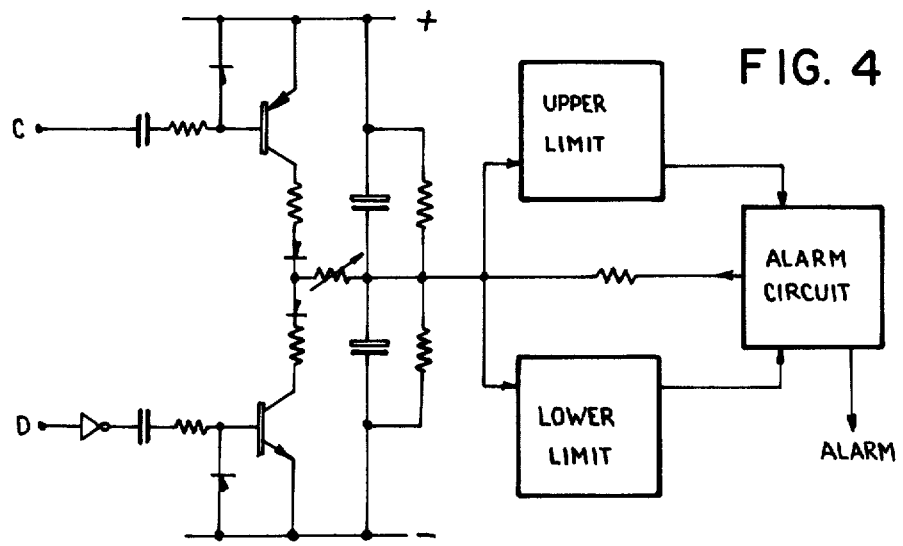
FIG. 4 is an electronic counter.
Figure 6:
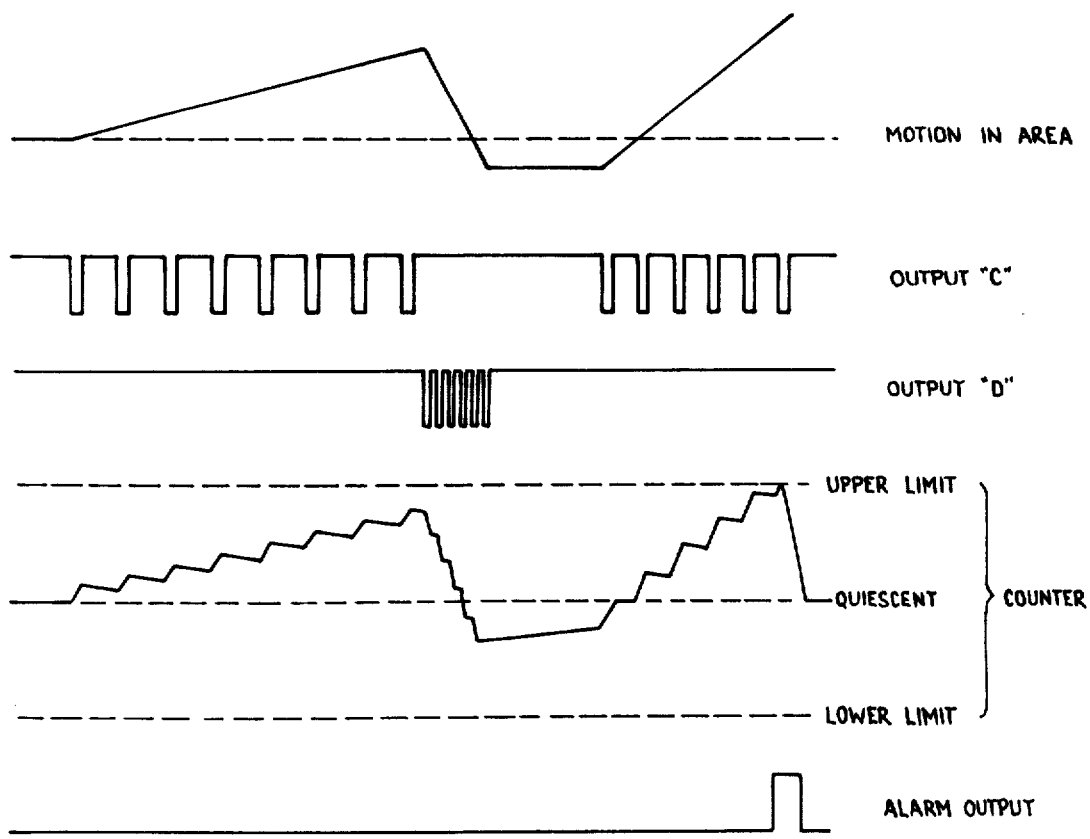
FIG. 6 illustrates the interrelationship of channel pulse trains processed by the counter circuit of FIG. 4.

In the preferred embodiment of the counter referring to FIG. 4 there is provided an analog integrating circuit which is wired to integrate the pulses from the phase comparator. The counter is bidirectional such that pulses from one channel will cause integration in the opposite direction to pulses from the other channel, see FIG. 6. Being an analog operation, the counting is stored as a capacitor voltage. The pulse width will therefore determine the increment in capacitor voltage per pulse in this preferred configuration, but this is not an essential feature.

The pulse counting could be achieved by means of digital counters, however, such a design is complex for two reasons. Firstly, it is necessary to count both incrementally and decrementally. Secondly it is highly desirable to permit the count value to "decay" over a period of time, to overcome long term environmental changes which would cause false alarms. These features are not difficult to achieve digitally but are more costly than the analog method.

Also provided in the preferred embodiment of the counter is a sensitivity control. This is a rheostat wired to determined the count value for pulses, thereby affecting the number of pulses required before the threshold limit of counting is reached and the alarm circuitry consequently activated. This means that the amount of movement in one direction required to cause an output activation is adjustable. Thus, it is possible to adjust the sensitivity of the system to provide immunity to a certain degree of environmental movement. This overcomes the need for a pre-set sensitivity within the counter which would be a compromise and may be excessive for troublesome environments yet in-adequate for high-risk areas.

This feature of adjustable sensitivity is complex to achieve with a digital counting circuit, in addition to the features of bidirectional counting and slow decay.

We claim:

1. In an intrusion detector in which a signal generated by a microwave or ultrasonic generator is radiated into an area under surveillance and reflected from every object in the area; a receiver to receive said reflected signal and to present said reflected signal to a pair of mixers, each said mixer mixing said reflected signal with a portion of the transmitter signal, the improvement comprising (a) splitting of said portion of said transmitter signal into two paths, and (b) introducing a relative phase difference between said two paths, the resultant signals being fed into said mixers to produce Doppler signals of equal frequency and amplitude but differing phase, said Doppler signals being presented to phase detecting means having two output channels controlled such that only one such channel may produce an output pulse at any instant, the channel outputs representing incremental and decremental movement of said objects in said area respectively.

2. The invention of claim 1 wherein said phase detecting means includes a set of simple logic gates for providing at least a twin channel output determined by the relative phase difference in said Doppler signals such that if one signal leads another in phase then one output transmits the signal and vice versa.

3. The invention of claim 1 including a counter for receiving pulses from both channels, the arrangement being such that counters will count incrementally all pulses from one of the channels and will count decrementally all pulses for the other of the channels so that the counter will count either incrementally or decrementally responsive to movement in the appropriate direction, thus resulting in integration of unidirectional movement in the surveyed area.

4. The invention of claim 3 wherein the counter is connected to an alarm device which alarm device is actuated upon said counter counting a predetermined number of incremental or decremental pulses, said number being proportional to the distance of unidirectional movement of an object in the area surveyed.

5. The invention according to claim 3 in which the value of the count which has occurred after movement has occurred will slowly decay to zero in order to prevent any eventual false alarm caused by occasional interference, building movement, or other environmental factors and willful defeat yet maintaining high sensitivity.

6. The invention according to claim 3 in which the sensitivity of the detector is essentially independent of the range of the object being detected and independent of the setting of any range control device thereby permitting the use of realistic sensitivity control to allow adjustment of the sensitivity of the detector achieving the best compromise between false alarm immunity and ability to detect intrusion within a particular area and environment.

7. The invention of claim 3 wherein said output channels of said phase detection means produce symmetrical outputs of equal strength irrespective of the amplitude of said reflected signals and said Doppler signals presented to said phase detecting means, such that said counter will give equal weight to each pulse from either channel thereby preventing possible false activations of the detector near the extremity of the range of detection of said device.

8. The invention of claim 1 including a preamplifier for amplifying the received signal prior to presentation to the mixers said preamplifier including a gain adjustment to allow different size areas to be placed under surveillance, and automatic gain control circuitry effective upon the reflected signal to prevent loss of information concerning the direction of motion due to large signal reflection from objects close to the detector which may otherwise overload the preamplifier or mixers.

* * * * *